US009128698B2

(12) United States Patent
Gopal et al.

(10) Patent No.: US 9,128,698 B2
(45) Date of Patent: Sep. 8, 2015

(54) SYSTEMS, APPARATUSES, AND METHODS FOR PERFORMING ROTATE AND XOR IN RESPONSE TO A SINGLE INSTRUCTION

(71) Applicants: Vinodh Gopal, Westborough, MA (US); Gilbert M. Wolrich, Framingham, MA (US); James D. Guilford, Northborough, MA (US); Kirk S. Yap, Framingham, MA (US)

(72) Inventors: Vinodh Gopal, Westborough, MA (US); Gilbert M. Wolrich, Framingham, MA (US); James D. Guilford, Northborough, MA (US); Kirk S. Yap, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 13/631,242

(22) Filed: Sep. 28, 2012

(65) Prior Publication Data

US 2014/0095844 A1    Apr. 3, 2014

(51) Int. Cl.
*G06F 9/38*      (2006.01)
*G06F 9/30*      (2006.01)

(52) U.S. Cl.
CPC ........ *G06F 9/30029* (2013.01); *G06F 9/30032* (2013.01); *G06F 9/30036* (2013.01); *G06F 9/30167* (2013.01)

(58) Field of Classification Search
None
See application file for complete search history.

(56) References Cited

U.S. PATENT DOCUMENTS

2009/0182981 A1*  7/2009  Greiner et al. ................ 712/204

\* cited by examiner

*Primary Examiner* — Scott Sun
(74) *Attorney, Agent, or Firm* — Nicholson De Vos Webster & Elliott LLP

(57) ABSTRACT

Disclosed herein are systems, apparatuses, and methods performing in a computer processor of performing a rotate and XOR in response to a single XOR and rotate instruction, wherein the rotate and XOR instruction includes a first and second source operand, a destination operand, and an immediate value.

20 Claims, 20 Drawing Sheets

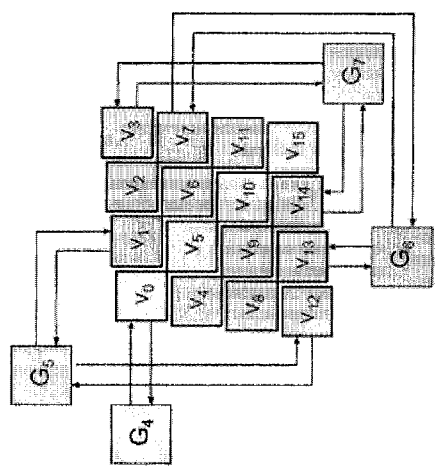
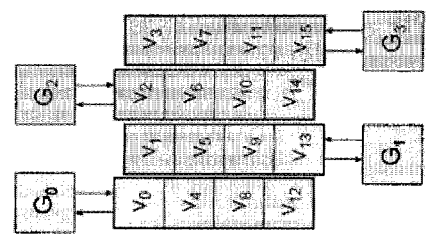
Figure 1
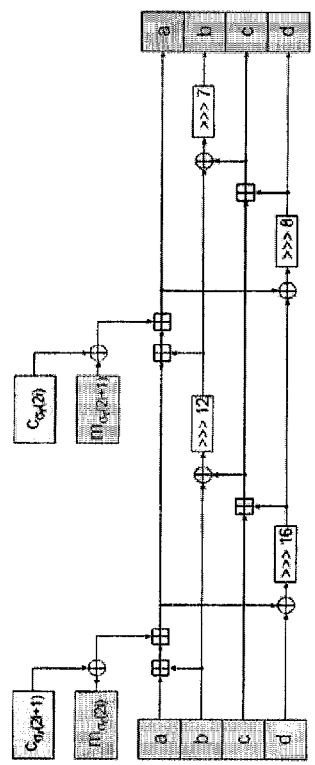
Figure 2

```
IF (IMM8[7]) {
DST = (SRC1 ^ SRC2) <<< IMM8[5:0]; // E.G., BLAKE
}
ELSE {
DST = (SRC1 <<< IMM8[5:0]) ^ SRC2;  // E.G., SKEIN
}
```

FIGURE 9

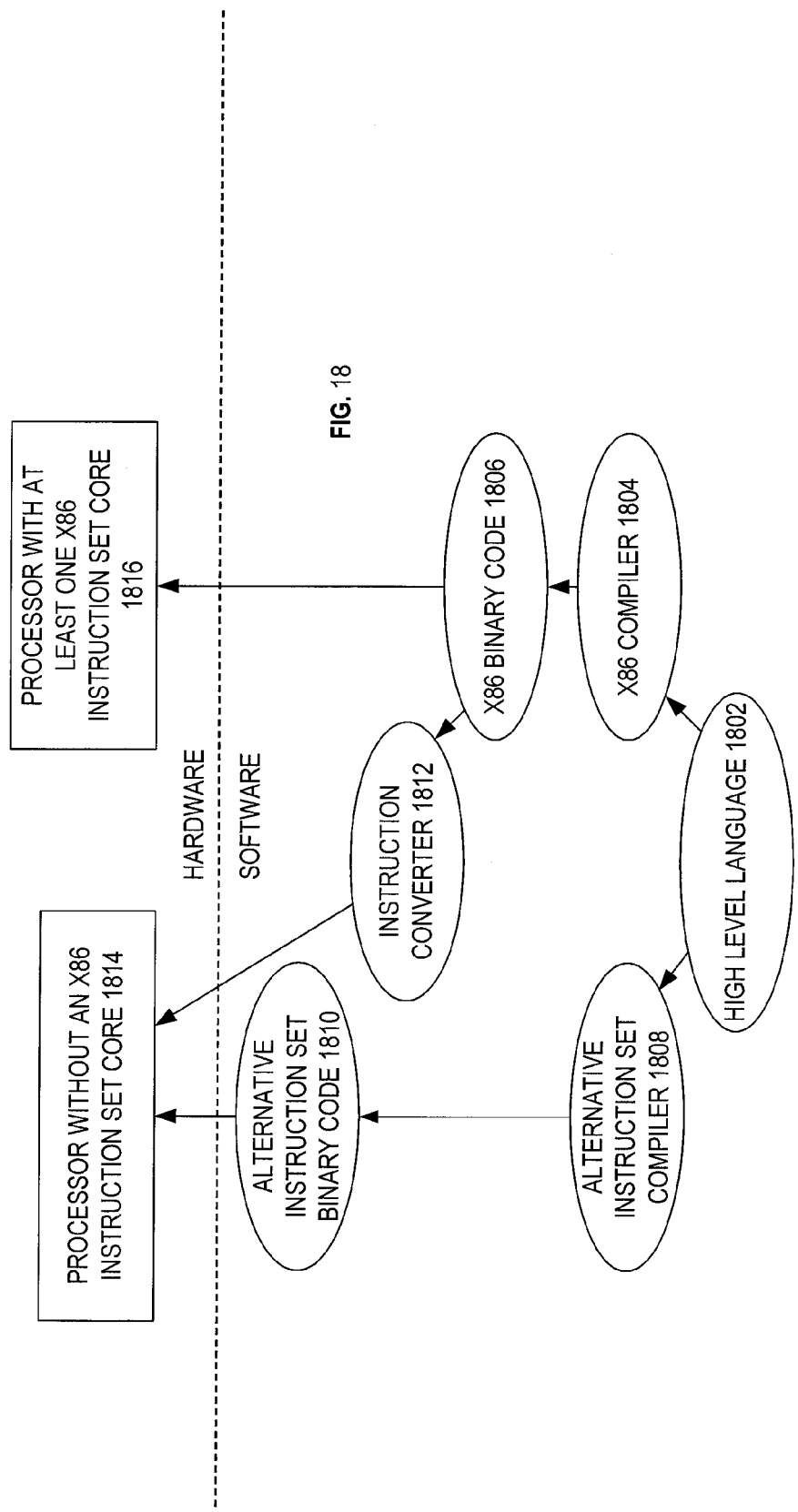

SYSTEMS, APPARATUSES, AND METHODS FOR PERFORMING ROTATE AND XOR IN RESPONSE TO A SINGLE INSTRUCTION

FIELD OF INVENTION

The field of invention relates generally to computer processor architecture, and, more specifically, to instructions which when executed cause a particular result.

BACKGROUND

The Blake Secure Hashing algorithm is one of five algorithms that will become the new NIST SHA-3 Standard. BLAKE is a family of four hash functions: BLAKE-224, BLAKE-256, BLAKE-384, and BLAKE-512. BLAKE-256 and BLAKE-224 are based on 32 bit words, while BLAKE-512 and BLAKE-384 are based on 64 bit words. BLAKE-256 is BLAKE with 32-bit words, 14 rounds, and 256-bit output and BLAKE-512 is BLAKE with 64-bit words, 16 rounds, and 512-bit output.

The compression function of BLAKE is based on state represented by a 4×4 matrix of either 32 bit or 64 bit words. A round of BLAKE consists of performing independent column updates followed by independent updates of the diagonal elements of the state matrix. For each column and diagonal update two message words and two predetermined constants are input to the state.

The 16 word state v0 to v15 is represented in matrix form as:

|v0 v1 v2 v3|
|v4 v5 v6 v7|
|v8 v9 v10 v11|
|v12 v13 v14 v15|

A round of BLAKE is a transformation of the v0 to v15 state matrix that uses the function:

G(a,b,c,d) to first update the state matrix columns G0(v0, v4, v8, v12) G1(v1, v5, v9,v13) G2(v2, v6, v10, v14) G3(v3, v7, v11, v15) and then to update the diagonals of the state matrix G4(v0, v5, v10, v15) G5(v1,v6, v11, v12) G6(v2, v7, v8, v13) G7(v3, v4, v9, v14). This is illustrated in FIG. 1.

The G function consists of 8 dependent steps:

$a=a+b+(m\_r(2i)\char`\^c\_r(2i+1))$ $d=(d\char`\^a)>\!>\!>16$ $c=c+d$ $b=(b\char`\^c)>\!>\!>12$ $a=a+b+(m\_r(2i+1)\char`\^c\_r(2i))$ $d=(d\char`\^a)>\!>\!>8$ $c=c+d$ $b=(b\char`\^c)>\!>\!>7$ where m_r(2i and m_r(2i+1) are two of 16 messages words input each round and c_r(2i) and c_r(2i+1) are two of 16 constants.

The column update functions G0, G1, G2, G3 are independent and can be executed in parallel. Upon completion of the column updates, the diagonal update functions G4, G5, G6, G7 are performed. G4, G5, G6, G7 are also completely independent and can be executed in parallel.

The G function requires 6 XORs, 6 adds, and 4 rotates as illustrated in FIG. 2. A round consisting of 8 G functions thus requires 48 XORs, 48 adds, and 32 rotates, for a total of 128 operations per round. An additional 28 XORs are needed for initialization and finalization. As an example, BLAKE-512 requires 16 rounds and 16*128=2048+28=2076 operations.

Skein algorithm is another of the five remaining algorithms in the NIST SHA3 secure hash standard. Skein is made up of 3 major functions MIX, Permute, and Sub-Key addition. The MIX function uses only three mathematical operations, XOR, Rotate, and carry-propagate additions on a pair of 64 bit words. An exemplary MIX function is illustrated in FIG. 3.

Each MIX function adds two 64 bit inputs producing the first 64 bits of the result, and an XOR of the addition result with a rotated version of the second input to produce the second 64 bits of the result. The MIX function is 128 bits wide, requiring two MIX functions per round for Skein-256, four MIX functions per round for Skein-512, and eight per round for Skein-1024.

A round of the Skein algorithm is the MIX functions across 256, 512 or 1024 bits, followed by a Permute of 64 bits words. There are 72 rounds of MIX/Permute with a Sub-key addition before the first round and then after every four rounds. FIG. 4 of 4 rounds of Skein-256 is from the Skein Hash Function Family document.

BRIEF DESCRIPTION OF THE DRAWINGS

The present invention is illustrated by way of example and not limitation in the figures of the accompanying drawings, in which like references indicate similar elements and in which:

FIG. 1 illustrates part of a Blake secure hashing algorithm.
FIG. 2 illustrates part of a Blake secure hashing algorithm.
FIG. 9 illustrates an embodiment of pseudo-code for the ROTATEandXOR instruction.
FIG. 18 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Existing cryptographic hash algorithms such as SHA1/2 also use rotate and XOR operations and the Blake and Skein hashing algorithms and will benefit from a dedicated rotate and XOR instruction. An integer instruction that combines the XOR and Rotate operation, would reduce the number operations in the G function by 4 (from 16 to 12), or a saving of ~25%. Given that the operations are serialized in these types of hashing functions, the performance gain can be larger as the XOR-rotate operations are on the critical path of data processing. Processing 4 rounds of Skein-512 with integer IA instructions requires 16 additions, 16 rotates, 16 xors, and 12 sub-key additions (4 adds to develop the sub-key and 8 adds to update state every 4 rounds) for a total of 60 instructions. An instruction to combine the rotate and XOR operation, would reduce that total to 44, or a savings of ~36%.

Figure 4:
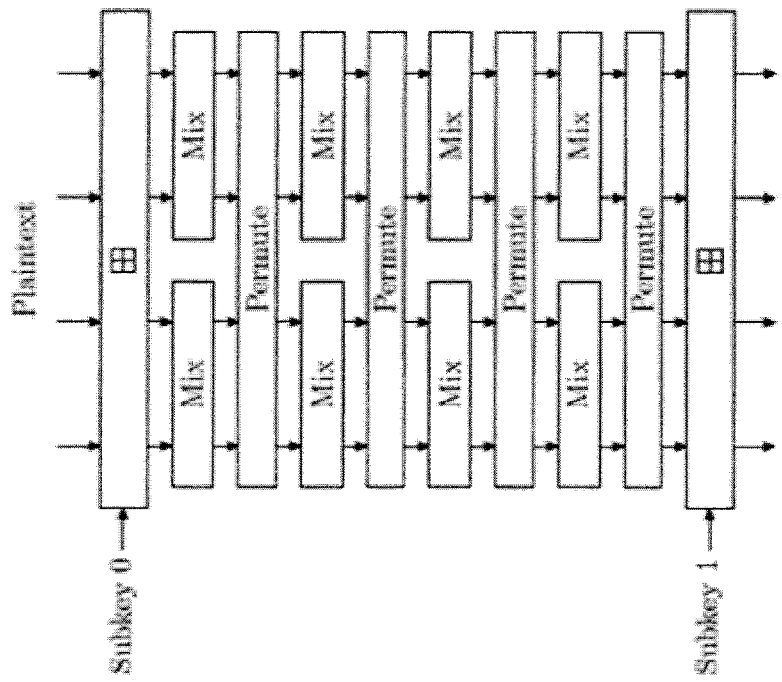
FIG. 4 illustrates part of a Skein secure hashing algorithm.
Figure 3:
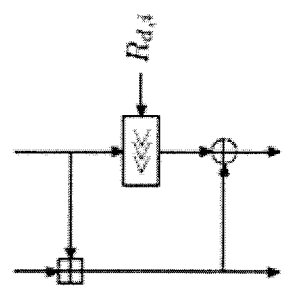
FIG. 3 illustrates part of a Skein secure hashing algorithm.
Figure 5:
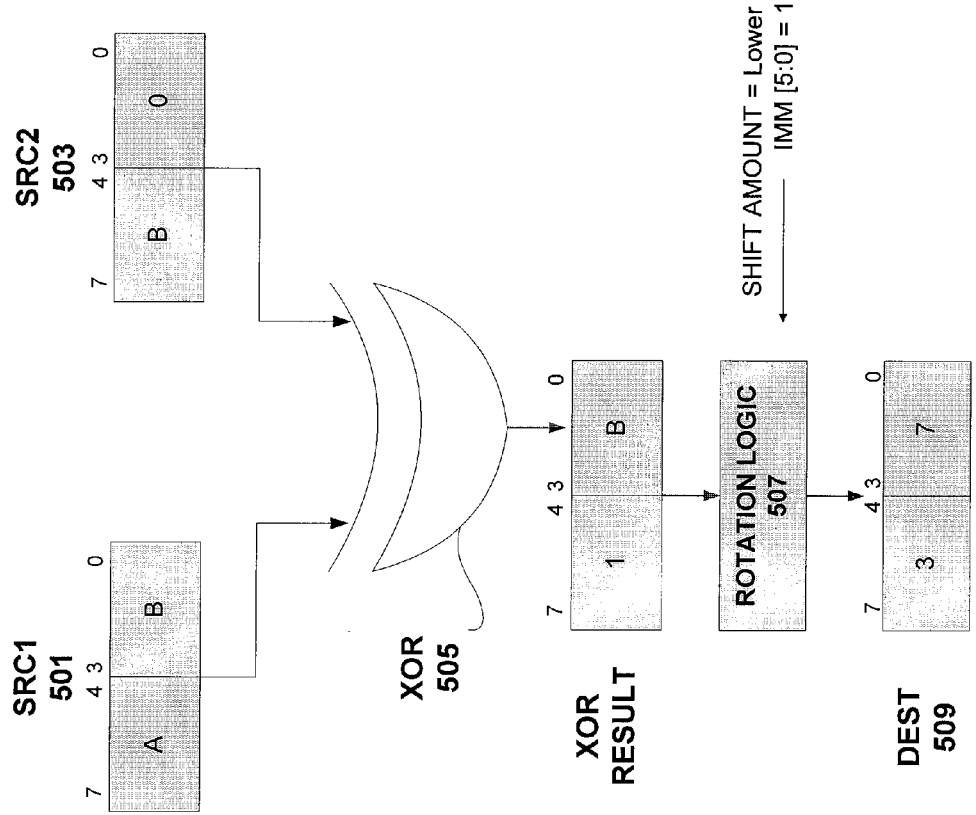
FIG. 5 illustrates an exemplary illustration of an operation of an exemplary ROTATEandXOR instruction.

FIG. 5 illustrates an exemplary illustration of an operation of an exemplary ROTATEandXOR instruction. In this illustration there are two 8-bit source registers (SRC1 501 and SRC2 503). For ease of understanding, the contents of these registers are shown as hex values xAB in SRC1 501 and xB0 in SRC2 503. As will be detailed below, embodiments of the present invention are not limited to 8-bit sources, and they could be utilized with any source size including, but not limited to, 8-bit, 16-bit, 32-bit, 64-bit, 128-bit, etc.

In this example, the two sources 501, 503 are exclusive-ORed (XORed) together using XOR logic 505. The result of the XOR is then rotated by a set number of positions by rotation logic 507. In the embodiment illustrated, the rotation is a left rotate by a set number of bit positions, however, in other embodiments the rotation may be a right rotate by the set number of bit positions. The number of bit positions to rotate is determined by a number of bits in an immediate of the ROTATEandXOR instruction. In this example, the six least significant bits of the immediate are used to determine the number of bits to rotate and the value of those bits is a 1. As such, the x1B value from the XOR is rotated left by 1 bit giving a new value of x37 which is stored in destination 509. Additionally, in some embodiments, the rotation is a shift that brings in a set value when bits of the XOR are shifted out (for example, all 0s or 1s are shifted in). The execution of this instruction is particularly useful in Blake secure hashing algorithm.

Figure 6:
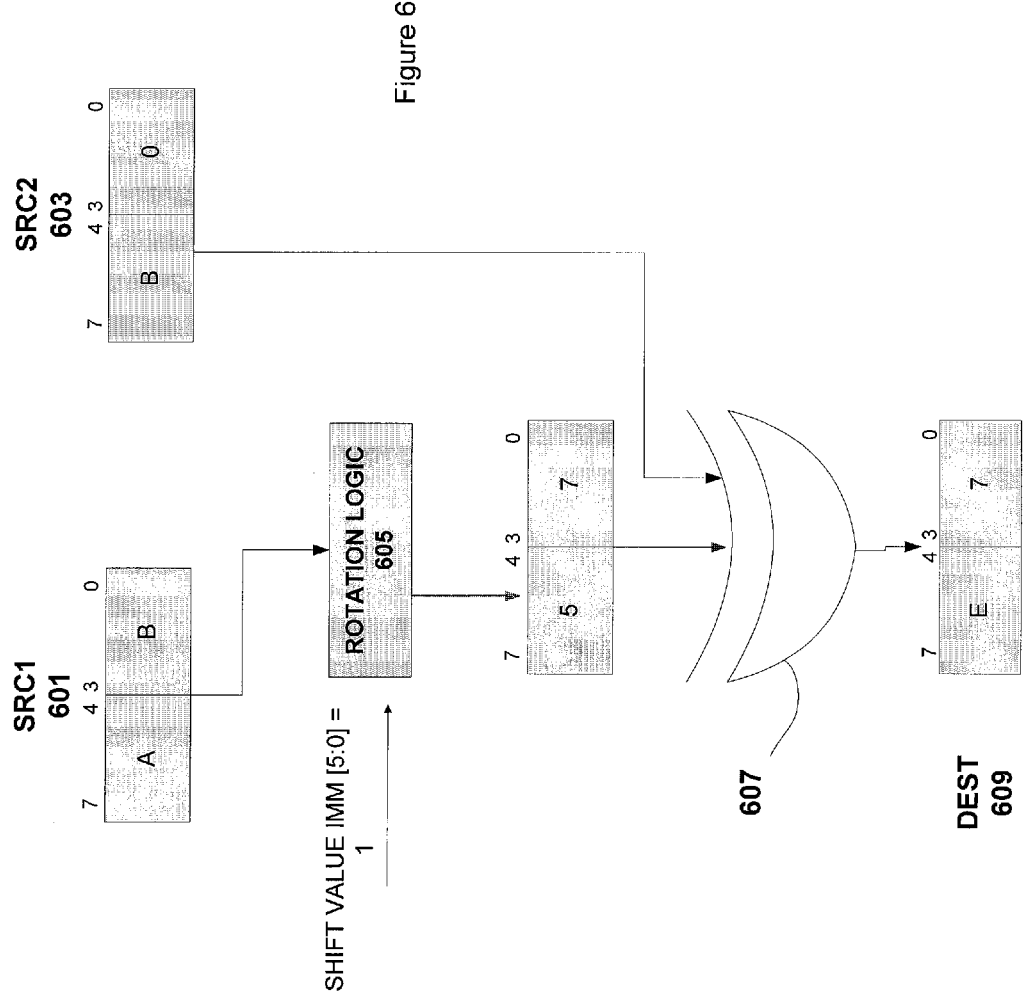
FIG. 6 illustrates another exemplary illustration of an operation of an exemplary ROTATEandXOR instruction.

FIG. 6 illustrates another exemplary illustration of an operation of an exemplary ROTATEandXOR instruction. This example is different than the previous example in that the rotation occurs prior to any XOR operation. In this illustration there are two 8-bit source registers (SRC1 601 and SRC2 603). For ease of understanding, the contents of these registers are shown as hex values xAB in SRC1 601 and xB0 in SRC2 603. As will be detailed below, embodiments of the present invention are not limited to 8-bit sources, and they could be utilized with any source size including, but not limited to, 8-bit, 16-bit, 32-bit, 64-bit, 128-bit, etc.

In this example, the first sources 601 is rotated left by a set number of bit positions that is determined from an immediate of the instruction by rotation logic 605. Similar to the previous example, in other embodiments the rotation may be a right rotate by the set number of bit positions. In this example, the six least significant bits of the immediate are used to determine the number of bits to rotate and the value of those bits is a 1. As such, the xAB value from the first source 601 is rotated left by 1 bit giving a new value of x57. Additionally, in some embodiments, the rotation is a shift that brings in a set value when bits of the XOR are shifted out (for example, all 0s or 1s are shifted in).

The result of the rotation is then XORed using XOR logic 607 with the data from the second source 603. Accordingly, x57 is XORed with xB0 giving a result of xE7 and stored in a destination 609. The execution of this instruction is particularly useful as a part of a Skein hashing algorithm.

Exemplary Format

An exemplary format of this instruction is "ROTATEandXOR DEST, SRC1, SRC2, IMM" where the operand DEST is a destination register (such as a 8-bit, 16-bit, 32-bit, 64-bit, etc. register) or memory location, SRC1 and SRC2 are sources that may either be registers, memory locations, or a combination of both of the same size as the destination. IMM is an immediate value of the instruction and may be any number of bits, however, in one embodiment the IMM is an 8-bit value. ROTATEandXOR is the instruction's opcode.

Exemplary Methods of Execution

Figure 7A:
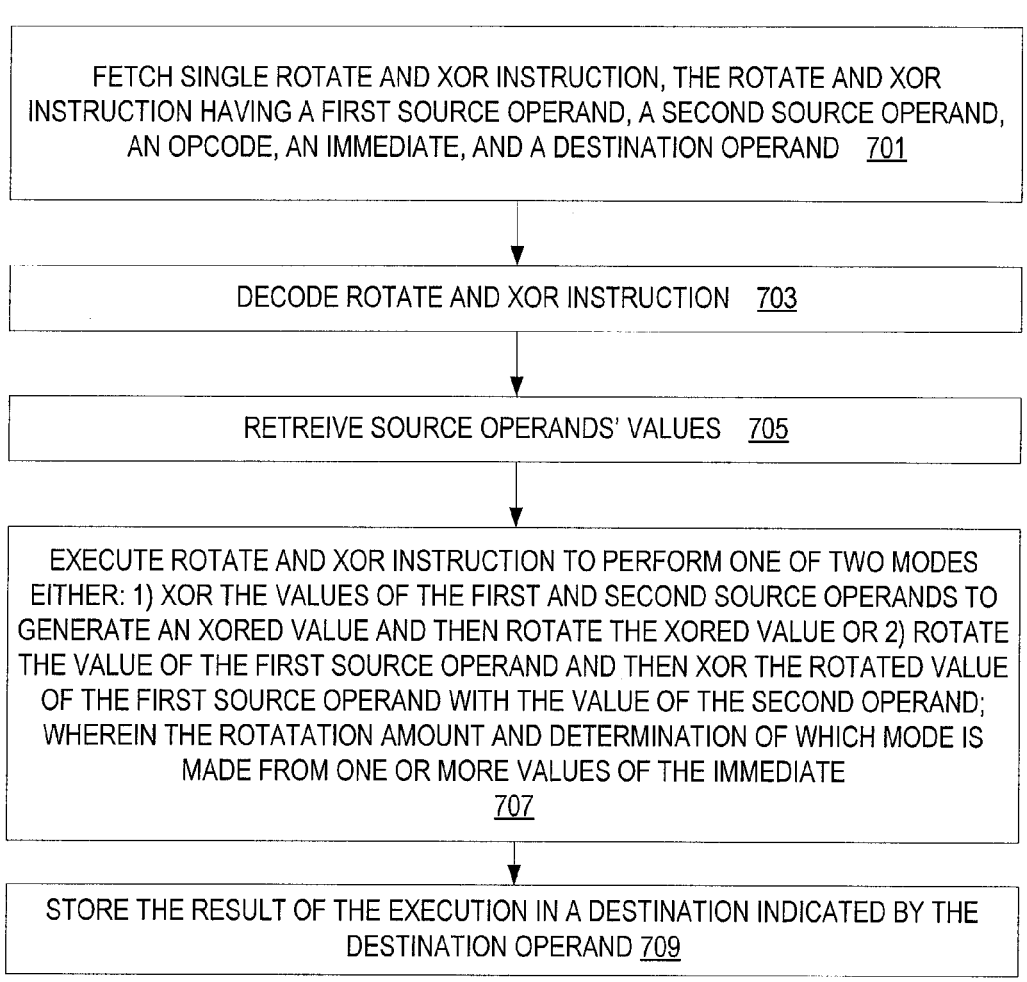
FIGS. 7(A)-(C) illustrate several different embodiments of an execution of a ROTATEandXOR instruction in a processor.
Figure 7B:
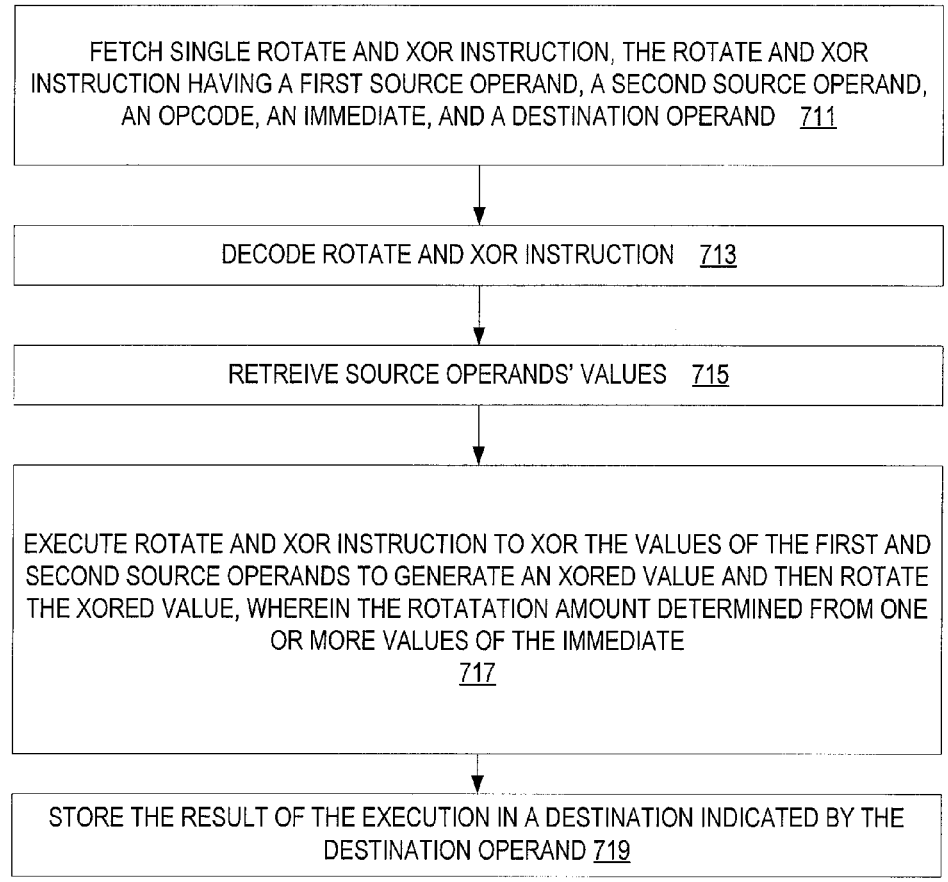
Figure 7C:
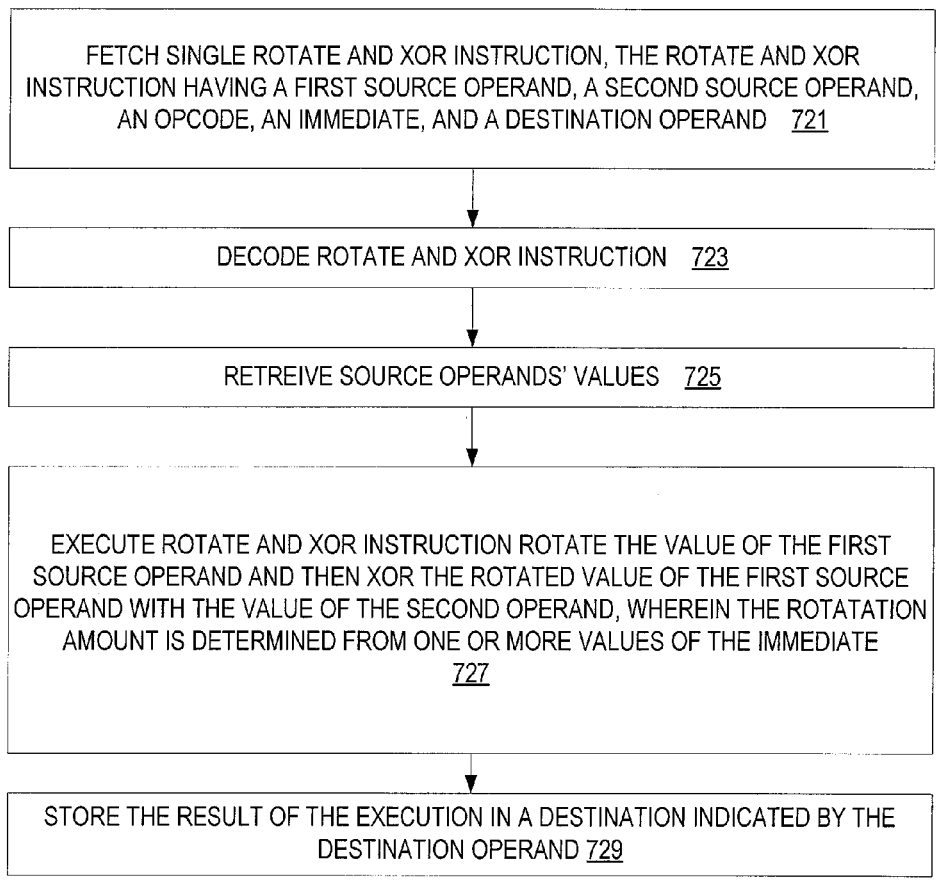

FIGS. 7(A)-(C) illustrate several different embodiments of an execution of a ROTATEandXOR instruction in a processor.

In FIG. 7(A), a ROTATEandXOR instruction with a two source operands (registers, memory locations, or both), destination operand (either a register or memory location), an opcode, and an immediate is fetched at 701.

The ROTATEandXOR instruction is decoded by decoding logic at 703. Depending on the instruction's format, a variety of data may be interpreted at this stage such as which registers to write to and retrieve, what memory address to access, etc.

The source operands' values are retrieved/read at 705. For example, the source registers are read. If either of the source operands is a memory operand, then the data associated with that operand are retrieved.

The ROTATEandXOR instruction (or operations comprising such an instruction such as microoperations) is executed by execution resources such as one or more functional units at 707 to execute the ROTATEandXOR instruction to perform one of two modes, either a first mode of XORing the values of the first and second source operands to generate an XORed value and then rotate the XORed value (such as what was illustrated in FIG. 5), or a second mode of rotating the value of the first source operand and then XORing that rotated value by the value of the second operand (such as what was illustrated in FIG. 6). As noted above, the rotation may be either left or right depending upon the implementation.

The number of bit positions to rotate is determined by one or more values of the immediate. In some embodiments, the lower six bits of the immediate are used to make this determination. In these embodiments, the decimal value of these bits is the number of bit positions to rotate.

Additionally, the determination of which mode to use is set by one or more bits of the immediate value. In some embodiments, the most significant bit of the immediate is used for this purpose. For example, if the value is a 1, then the first mode is chosen and if the value is a 0 then the second mode is chosen. Of course the opposite convention could be used.

At 709, the result of the XOR and rotation (of either mode) is stored in the location associated with the destination operand. While 707 and 709 have been illustrated separately, in some embodiments they are performed together as a part of the execution of the instruction.

In FIG. 7(B), a ROTATEandXOR instruction with a two source operands (registers, memory locations, or both), destination operand (either a register or memory location), an opcode, and an immediate is fetched at 711.

The ROTATEandXOR instruction is decoded by decoding logic at 713. Depending on the instruction's format, a variety of data may be interpreted at this stage such as which registers to write to and retrieve, what memory address to access, etc.

The source operands' values are retrieved/read at 715. For example, the source registers are read. If either of the source operands is a memory operand, then the data associated with that operand are retrieved.

The ROTATEandXOR instruction (or operations comprising such an instruction such as microoperations) is executed by execution resources such as one or more functional units at 717 to execute the ROTATEandXOR instruction to XOR the values of the first and second source operands to generate an XORed value and then rotate the XORed value (such as what was illustrated in FIG. 5). As noted above, the rotation may be either left or right depending upon the implementation.

The number of bit positions to rotate is determined by one or more values of the immediate. In some embodiments, the lower six bits of the immediate are used to make this determination. In these embodiments, the decimal value of these bits is the number of bit positions to rotate.

At 719, the result of the XOR and rotation is stored in the location associated with the destination operand. While 717 and 719 have been illustrated separately, in some embodiments they are performed together as a part of the execution of the instruction.

In FIG. 7(C), a ROTATEandXOR instruction with a two source operands (registers, memory locations, or both), destination operand (either a register or memory location), an opcode, and an immediate is fetched at 721.

The ROTATEandXOR instruction is decoded by decoding logic at 723. Depending on the instruction's format, a variety of data may be interpreted at this stage such as which registers to write to and retrieve, what memory address to access, etc.

The source operands' values are retrieved/read at 725. For example, the source registers are read. If either of the source operands is a memory operand, then the data associated with that operand are retrieved.

The ROTATEandXOR instruction (or operations comprising such an instruction such as microoperations) is executed by execution resources such as one or more functional units at 727 to execute the ROTATEandXOR instruction to rotate the value of the first source operand and then XORing that rotated value by the value of the second operand (such as what was illustrated in FIG. 6). As noted above, the rotation may be either left or right depending upon the implementation.

The number of bit positions to rotate is determined by one or more values of the immediate. In some embodiments, the lower six bits of the immediate are used to make this determination. In these embodiments, the decimal value of these bits is the number of bit positions to rotate.

At 729, the result of the XOR and rotation is stored in the location associated with the destination operand. While 727 and 729 have been illustrated separately, in some embodiments they are performed together as a part of the execution of the instruction.

Figure 8A:
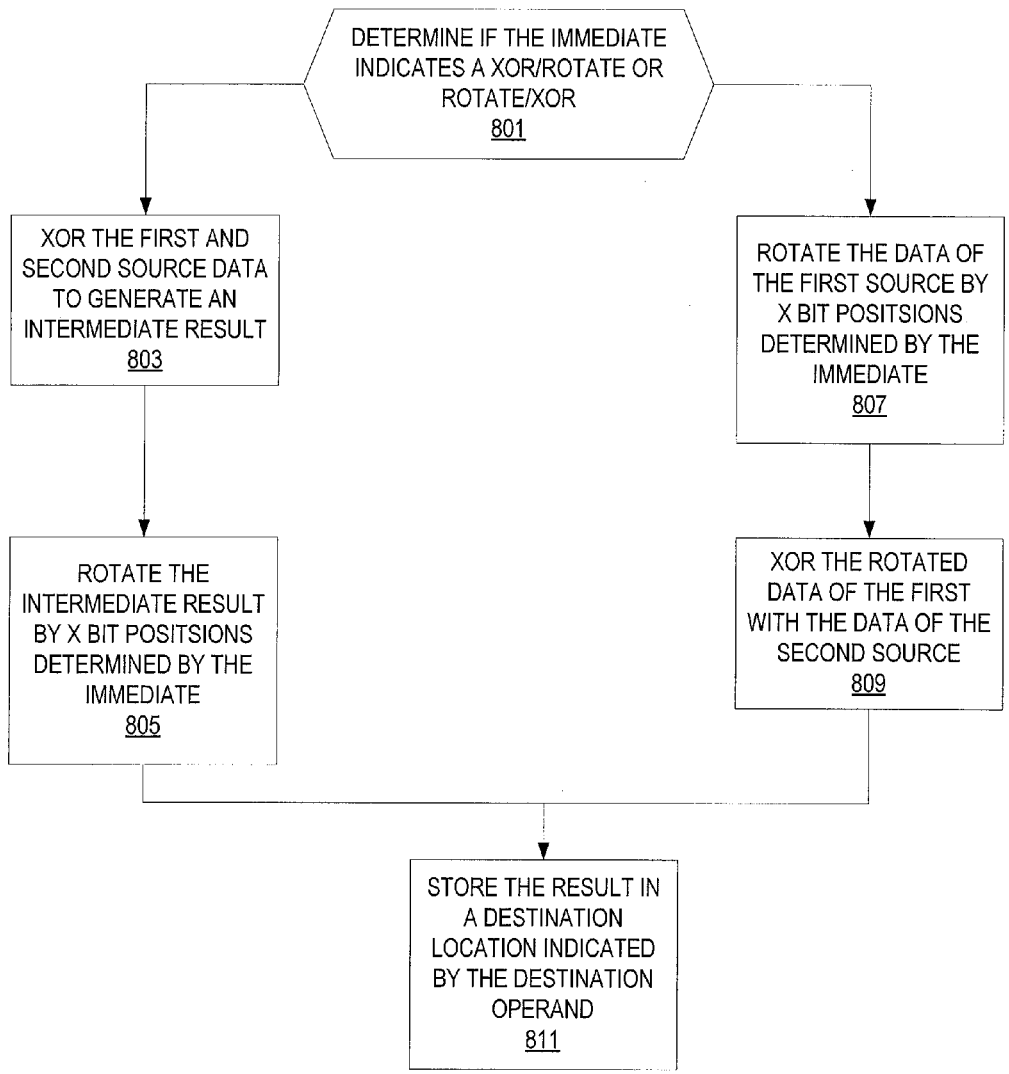
FIGS. 8(A)-(C) illustrate embodiments of a method for processing a ROTATEandXOR instruction.
Figure 8B:
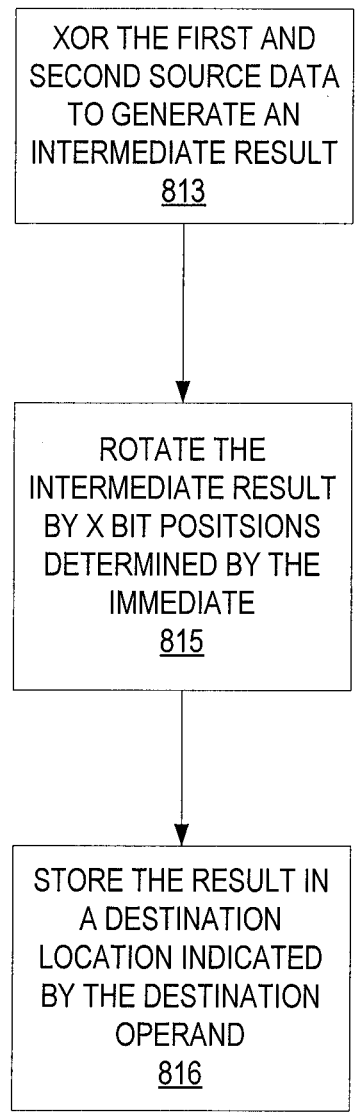
Figure 8C:
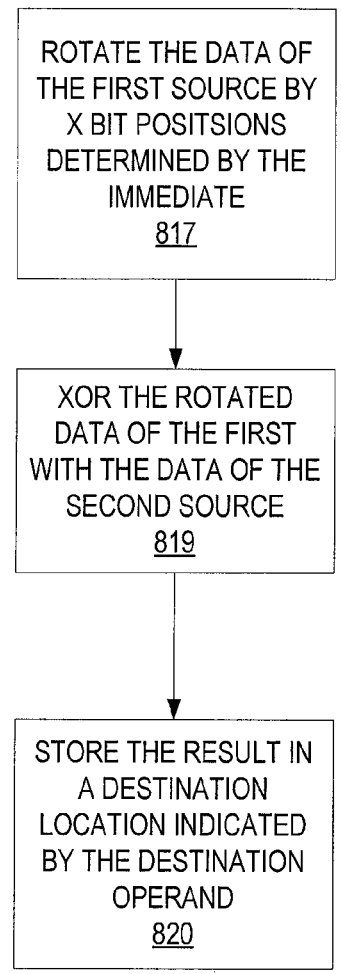

FIGS. 8(A)-(C) illustrate embodiments of a method for processing a ROTATEandXOR instruction. In these embodiments it is assumed that some, if not all, of the operations fetch, decode, and retrieve steps have been performed earlier, however, they are not shown in order to not obscure the details presented below.

In FIG. 8(A), at 801, a determination of if the immediate of the ROTATEandXOR instruction indicates that a XOR/Rotate or Rotate/XOR operation should be performed is made. In some embodiments, the most significant bit of the immediate determines the mode (as detailed earlier).

If a XOR/Rotate mode is indicated, then the data from the first and second sources is XORed to generate an intermediate result at 803. This intermediate result is rotated X bit positions at 805. The number of bit positions, X, is determined by one or more bits of the immediate as detailed earlier. For example, the decimal value of the six least significant bits may give the number X.

The result of the XORing and rotation operations is stored in a destination location indicated by the destination operand at 811.

If a Rotate/XOR mode is indicated, then the data of the first source is rotated X bit positions at 807. The number of bit positions, X, is determined by one or more bits of the immediate as detailed earlier. For example, the decimal value of the six least significant bits may give the number X.

This rotated value is XORed with the data of the second source at 809.

The result of the XORing and rotation operations is stored in a destination location indicated by the destination operand at 811.

In FIG. 8(B), at 813 the data from the first and second sources is XORed to generate an intermediate result at 8. This intermediate result is rotated X bit positions at 815. The number of bit positions, X, is determined by one or more bits of the immediate as detailed earlier. For example, the decimal value of the six least significant bits may give the number X.

The result of the XORing and rotation operations is stored in a destination location indicated by the destination operand at 816.

In FIG. 8(C), the data of the first source is rotated X bit positions at 817. The number of bit positions, X, is determined by one or more bits of the immediate as detailed earlier. For example, the decimal value of the six least significant bits may give the number X.

This rotated value is XORed with the data of the second source at 819.

The result of the XORing and rotation operations is stored in a destination location indicated by the destination operand at 820.

FIG. 9 illustrates an embodiment of pseudo-code for the ROTATEandXOR instruction.

Exemplary Register Architecture

Figure 10:
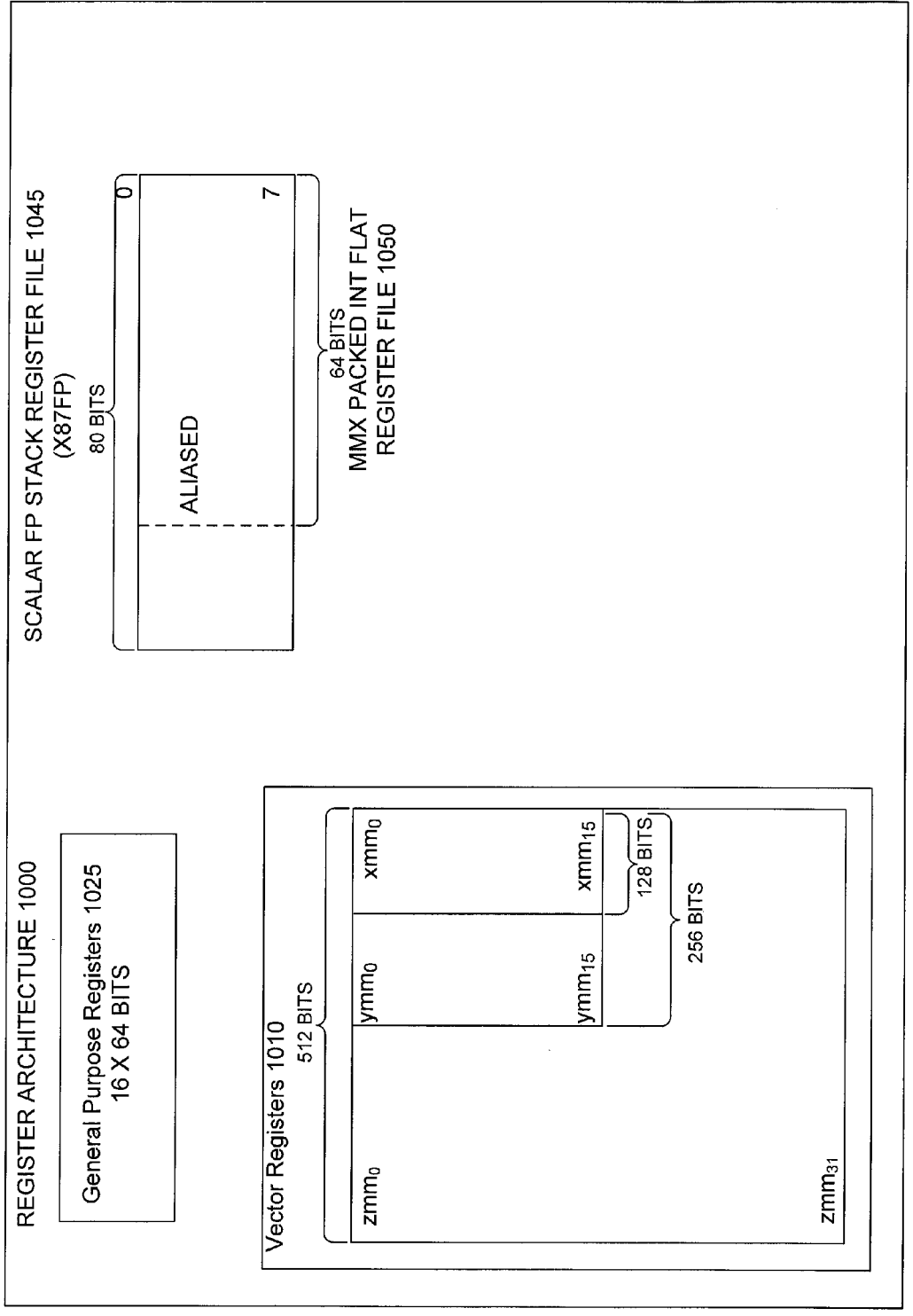
FIG. 10 is a block diagram of a register architecture 1000 according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 11:
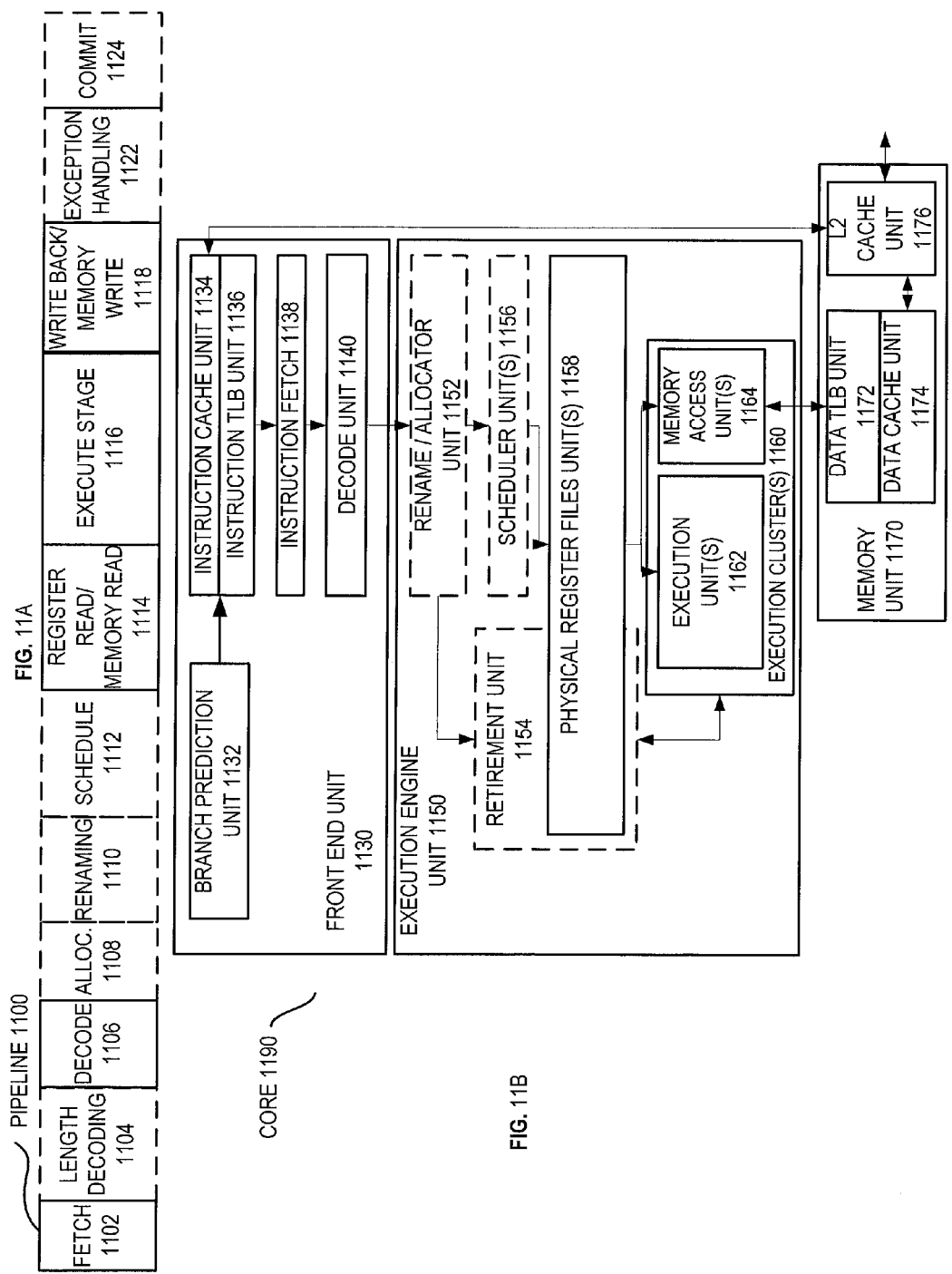
FIG. 11A is a block diagram illustrating both an exemplary in-order pipeline and an exemplary register renaming, out-of-order issue/execution pipeline according to embodiments of the invention.
FIG. 11B is a block diagram illustrating both an exemplary embodiment of an in-order architecture core and an exemplary register renaming, out-of-order issue/execution architecture core to be included in a processor according to embodiments of the invention.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12:
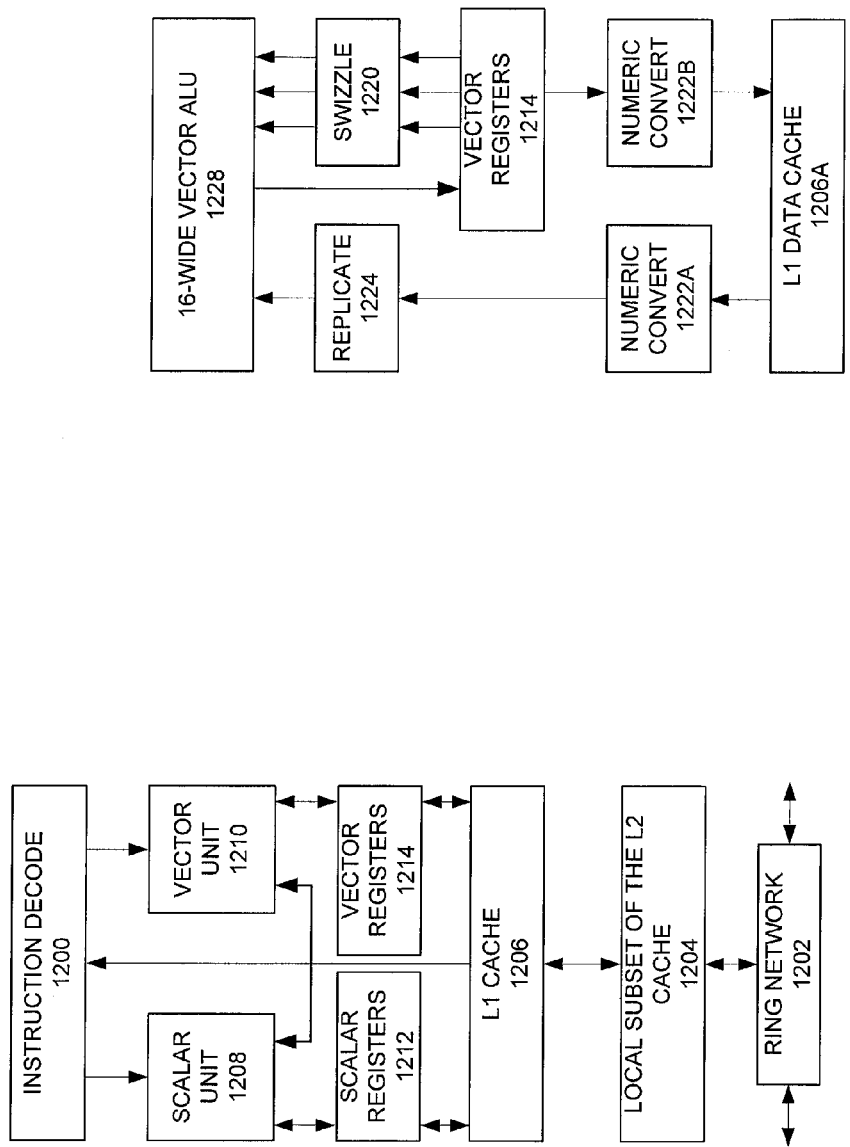
FIGS. 12A-B illustrate a block diagram of a more specific exemplary in-order core architecture, which core would be one of several logic blocks (including other cores of the same type and/or different types) in a chip.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input.

Processor with Integrated Memory Controller and Graphics

Figure 13:
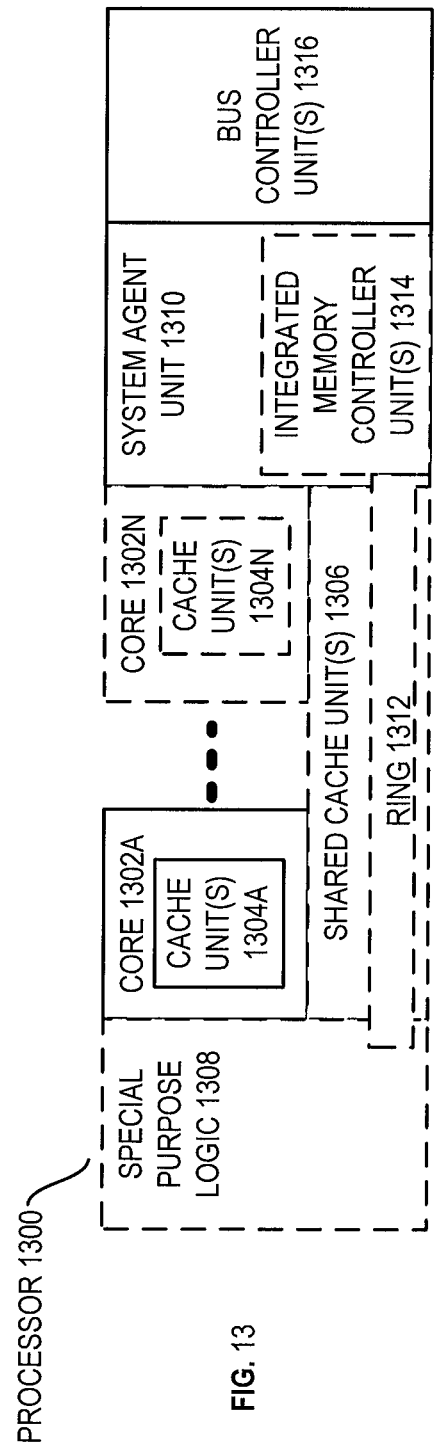
FIG. 13 is a block diagram of a processor 1300 that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
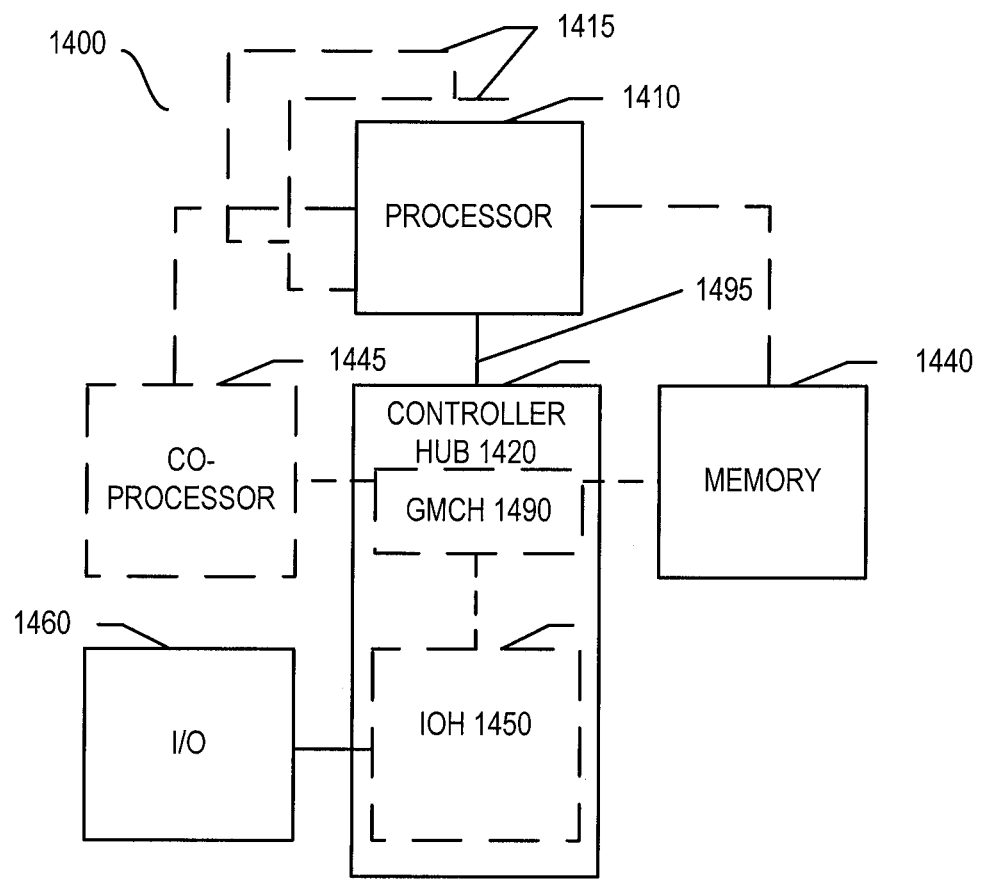
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
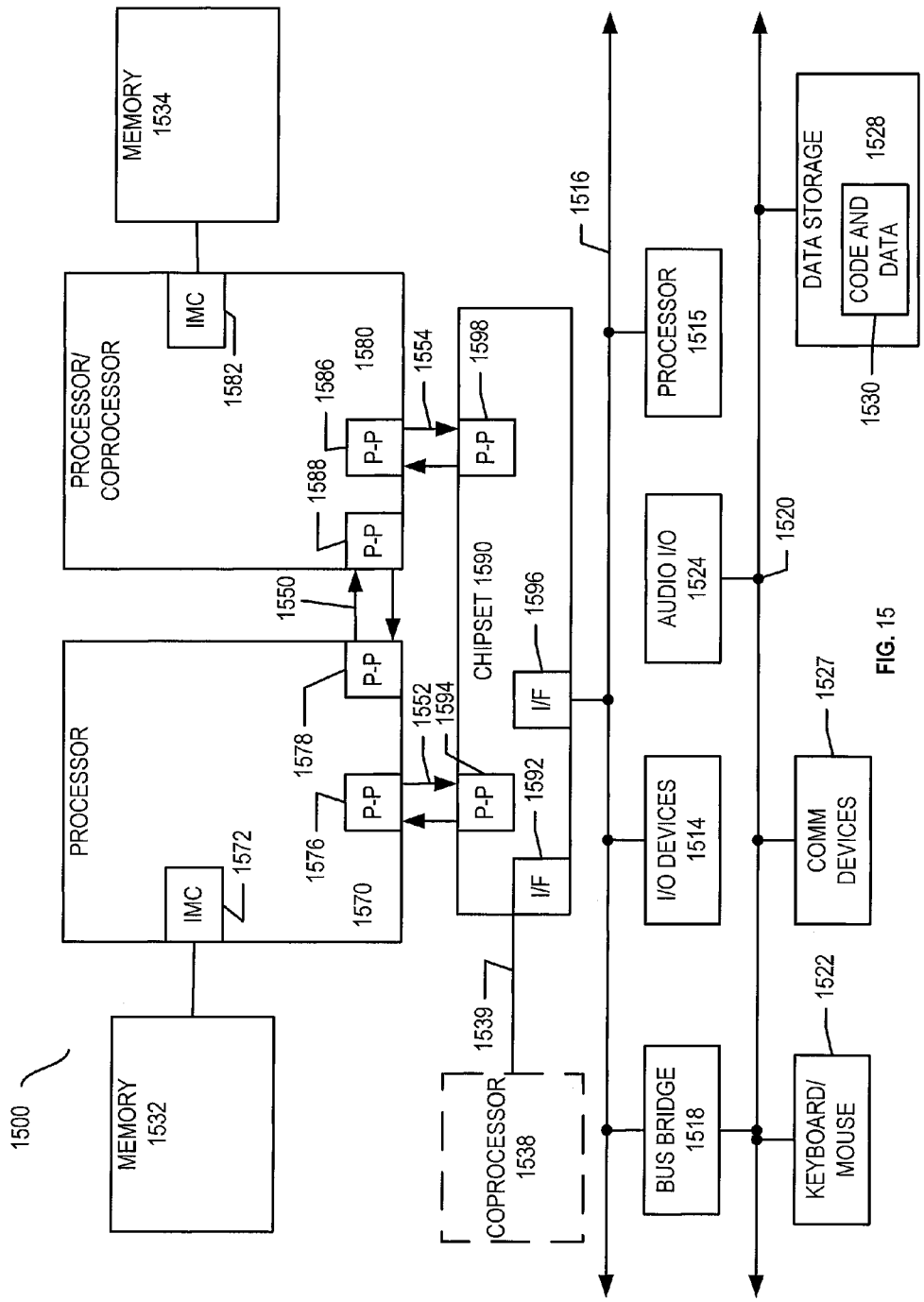

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
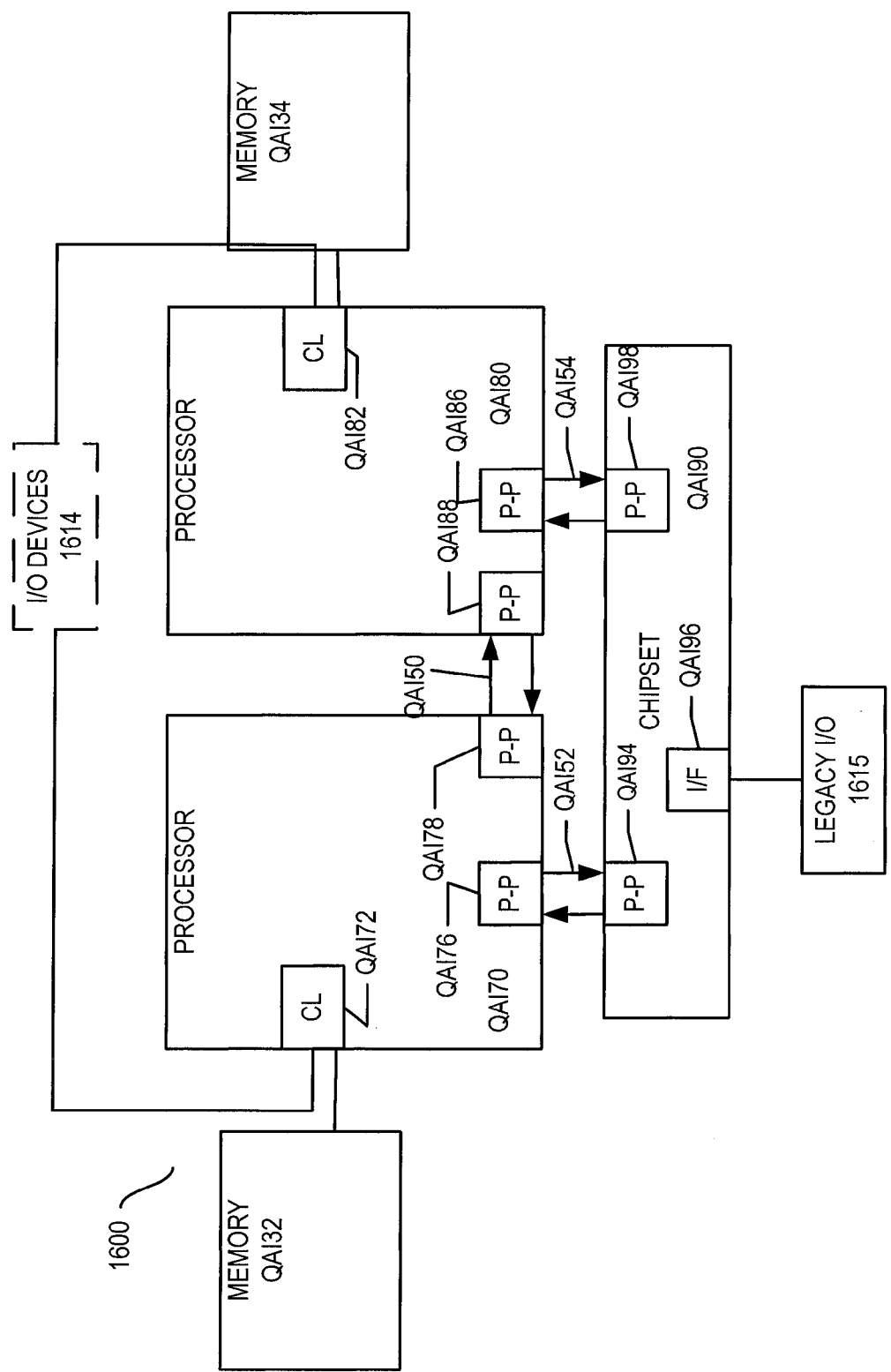

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
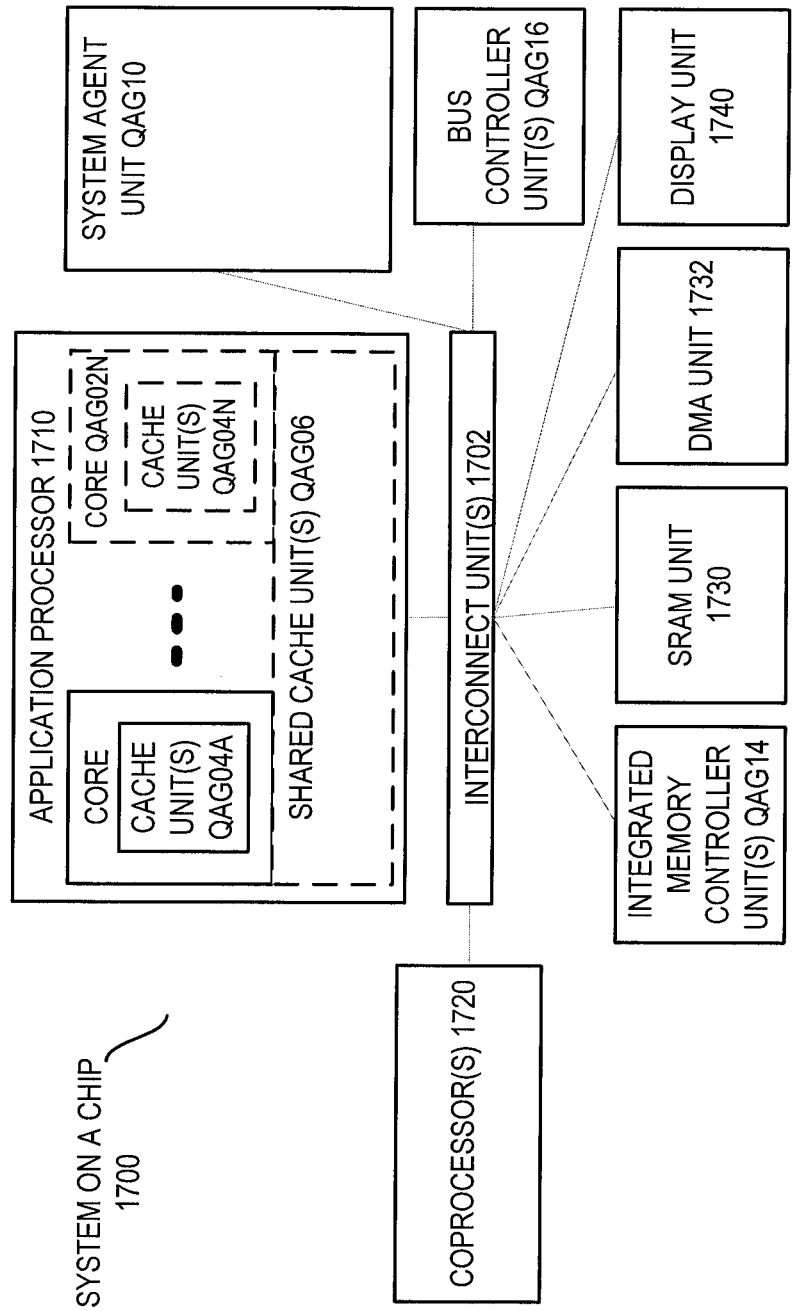

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A method of performing in a computer processor of performing an rotate and XOR in response to a single XOR and rotate instruction, wherein the rotate and XOR instruction includes a first and second source operand, a destination operand, an opcode, and an immediate value, the method comprising steps of:
executing the single rotate and XOR instruction to perform one of a first and second mode, wherein in the first mode executing causes XORing values of the first and second source operands to generate an XORed value and then rotating the XORed value by X number of bit positions, and in the second mode executing causes rotating a value of the first source operand by X number of bit positions and XORing the rotated value with a value from the second source operand; and
storing a result from either the first or second mode into a destination location associated with the destination operand.

2. The method of claim 1, wherein the X bit positions is a decimal value of one or more bits of the immediate.

3. The method of claim 2, wherein the one or more bits of the immediate are the six least significant bits of the immediate.

4. The method of claim 1, wherein the rotating is a left rotate.

5. The method of claim 1, wherein the XOR and rotate instruction is a part of a Skein hashing algorithm.

6. The method of claim 1, wherein the XOR and rotate instruction is a part of a Blake hashing algorithm.

7. The method of claim 1, wherein the first and second source operands are each associated with a register and the register sizes are one of 8-bit, 16-bit, 32-bit, or 64-bit.

8. The method of claim 1, further comprising:
determining which of the first and second modes is to be performed based upon a value of a bit of the immediate.

9. An article of manufacture comprising:
a tangible machine-readable storage medium having stored thereon an occurrence of an instruction, wherein the instruction's format specifies a first and a second source operand, a destination operand, an immediate, and an opcode, wherein the opcode instructs a machine, responsive to the single occurrence of the single instruction, to execute the single rotate and XOR instruction to perform one of a first and second mode, wherein in the first mode to execute causes XORing values of the first and second source operands to generate an XORed value and then rotate the XORed value by X number of bit positions, and in the second mode to execute causes rotating a value of the first source operand by X number of bit positions and XORing the rotated value with a value from the second source operand; and store a result from either the first or second mode into a destination location associated with the destination operand.

10. The article of manufacture of claim 9, wherein the X bit positions is a decimal value of one or more bits of the immediate.

11. The article of manufacture of claim 10, wherein the one or more bits of the immediate are the six least significant bits of the immediate.

12. The article of manufacture of claim 9, wherein the rotating is a left rotate.

13. The article of manufacture of claim 9, wherein the instruction is a part of a Skein hashing algorithm.

14. The article of manufacture of claim 9, wherein the instruction is a part of a Blake hashing algorithm.

15. The article of manufacture of claim 9, wherein the first and second source operands are each associated with a register and the register sizes are one of 8-bit, 16-bit, 32-bit, or 64-bit.

16. The article of manufacture of claim 9, wherein the opcode further instructs the machine to determine which of the first and second modes is to be performed based upon a value of a bit of the immediate.

17. An apparatus comprising;
a hardware decoder to decode single XOR and rotate instruction, wherein the rotate and XOR instruction includes a first and second source operand, a destination operand, an opcode, and an immediate value; and
execution logic to execute one of a first and second mode, wherein in the first mode executing causes XORing values of the first and second source operands to generate an XORed value and then rotating the XORed value by X number of bit positions, and in the second mode executing causes rotating a value of the first source operand by X number of bit positions and XORing the rotated value with a value from the second source operand; and store a result from either the first or second mode into a destination location associated with the destination operand.

18. The apparatus of claim 17, wherein the X bit positions is a decimal value of one or more bits of the immediate.

19. The apparatus of claim 18, wherein the one or more bits of the immediate are the six least significant bits of the immediate.

20. The method of claim 1, wherein the rotating is a left rotate.

* * * * *